United States Patent
Krishnaswamy et al.

(10) Patent No.: US 7,647,582 B2
(45) Date of Patent: Jan. 12, 2010

(54) APPLICATION DOMAIN MANAGER

(75) Inventors: Raja Krishnaswamy, Redmond, WA (US); Steven J. Pratschner, Issaquah, WA (US); Tarik Soulami, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 11/040,337

(22) Filed: Jan. 20, 2005

(65) Prior Publication Data

US 2006/0161887 A1    Jul. 20, 2006

(51) Int. Cl.
*G06F 9/44* (2006.01)
*G06F 9/45* (2006.01)

(52) U.S. Cl. .................. 717/120; 717/102; 717/115; 717/140; 717/153

(58) Field of Classification Search .................. None
See application file for complete search history.

(56) References Cited

U.S. PATENT DOCUMENTS 6,880,007 B1 *    4/2005    Gardos et al. ............... 709/225

* cited by examiner

*Primary Examiner*—Chuck O Kendall (57) ABSTRACT

An application domain manager enables a host application to create, initialize, customize, and otherwise manage an isolation construct within the application.

20 Claims, 4 Drawing Sheets

APPLICATION DOMAIN MANAGER

DRAWINGS

The detailed description refers to the following drawings.

DETAILED DESCRIPTION

Managing application domains within a process is described herein.

An application domain may be regarded as a construct within an execution environment that is a unit of isolation for a process. More particularly, the isolation construct may enable the code executed therein to be loaded from a specified source; the isolation construct may be aborted independent of other such isolation constructs; and processing within the isolation construct may be isolated so that a fault occurring therein does not affect other isolation constructs within the process. In other words, the effects of processing within an isolation construct are not visible to concurrently-running constructs until the overall process is made permanent. Further, for the sake of consistency, the discussion hereafter refers to "applications" and "processes," both of which may encompass any one of, at least, software programs, and applications (e.g., SQL), either singularly or in combination.

An example of an execution environment in which an application domain manager may be implemented is a runtime execution environment. Examples of runtime execution environments may include: Visual Basic runtime execution environment; Java® Virtual Machine runtime execution environment that is used to run, e.g., Java® routines; or Common Language Runtime (CLR) to compile, e.g., Microsoft .NET™ applications into machine language before executing a calling routine.

Figure 1:
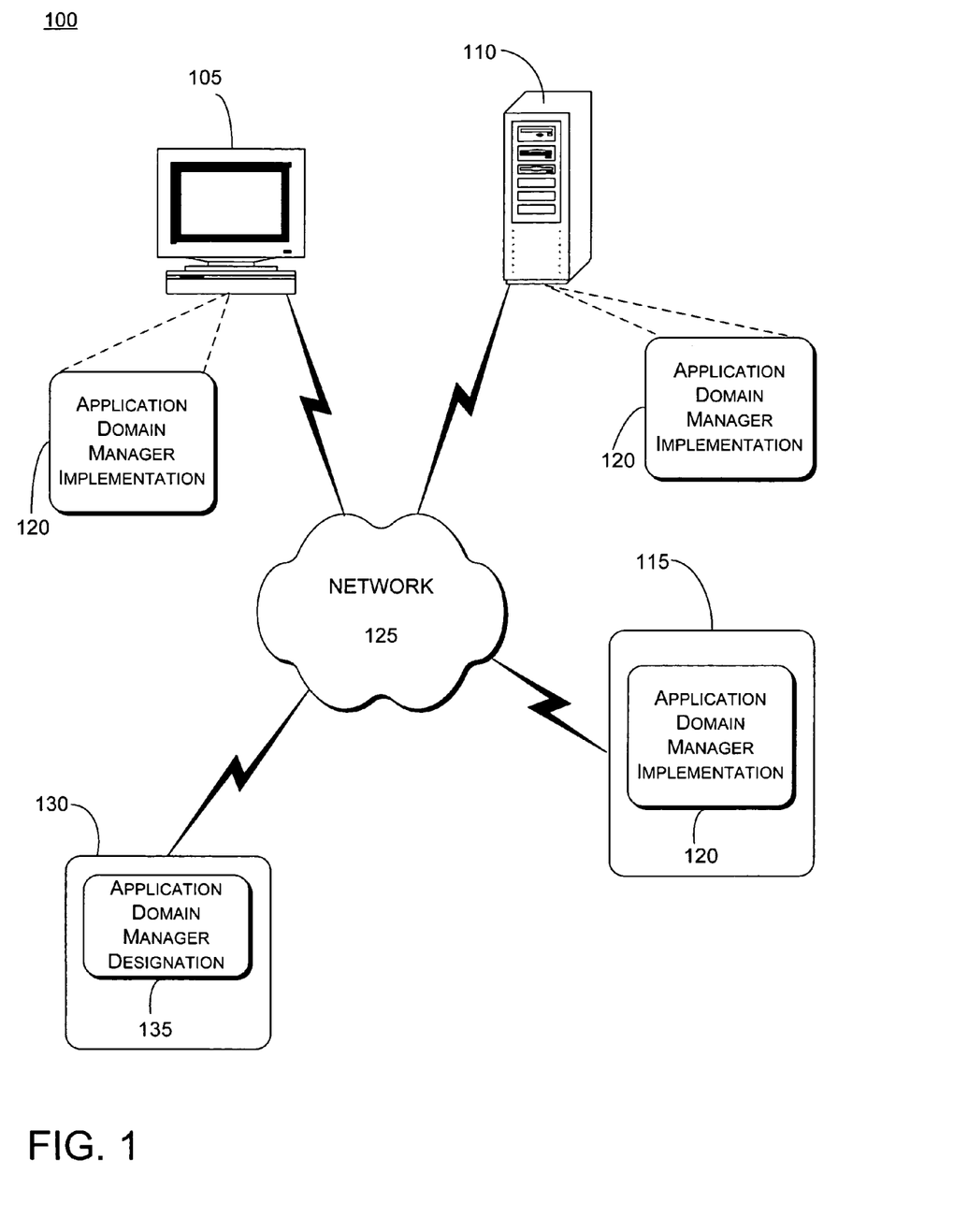
FIG. 1 shows a network environment in which examples of application domain managers may be implemented.

FIG. 1 shows an example of a network environment in which application domain managers may be implemented. More particularly, any one of client device 105, server device 110, and "other" device 115 may be capable of hosting an execution environment in which constructs within an application or process may be customized and controlled by application domain implementation 120, as described herein. Client device 105, server device 110, and "other" device 115 may be communicatively coupled to one another through network 125.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115. The data may be publicly available or alternatively restricted, e.g., restricted to only certain users or only if an appropriate subscription or licensing fee is paid. Server device 110 is at least one of a network server, an application server, a web blade server, or any combination thereof. Typically, server device 110 is any device that is the source of content, and client device 105 is any device that receives such content either via network 125 or in an off-line manner. However, according to the example implementations described herein, server device 105 and client device 110 may interchangeably be a sending host or a receiving host. "Other" device 115 may also be embodied by any of the above examples of server device 110.

"Other" device 115 may further be any device that is capable of hosting an execution environment in which constructs within an application or process may be customized and controlled by application domain implementation 120 according to one or more of the example implementations described herein. That is, "other" device 115 may be any software-enabled computing or processing device that is capable of managing one or more isolation constructs within at least one application, program, function, or other assemblage of programmable and executable code, in either of a runtime execution environment or some other hosting execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 represents any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Data source 130 may represent any one of a variety of conventional computing devices, including a desktop personal computer (PC), that is capable of customizing and controlling (i.e., managing) one or more isolation constructs (e.g., application domains) within an application, program, function, or other assemblage of programmable and executable code. Alternatively, data source 130 may also be any one of a workstation, mainframe computer, Internet appliance, set-top box, gaming console, personal digital assistant (PDA), laptop computer, cellular telephone, etc., that is capable of transmitting at least a portion of an application, program, or function to another work station. Further, although data source 130 may be a source of code for the application, program, or function, for at least the purpose of explaining one or more examples of application domain manager implementation 120, data source 130 may be regarded as at least the source of an application domain manager or an identifier thereof. Regardless of the implementation, the application domain manager, or identity or expression thereof, may be transmitted from data source 130 to any of devices 105, 110, and 115 as part of an on-line notification via network 125 or as part of an off-line notification.

Figure 2:
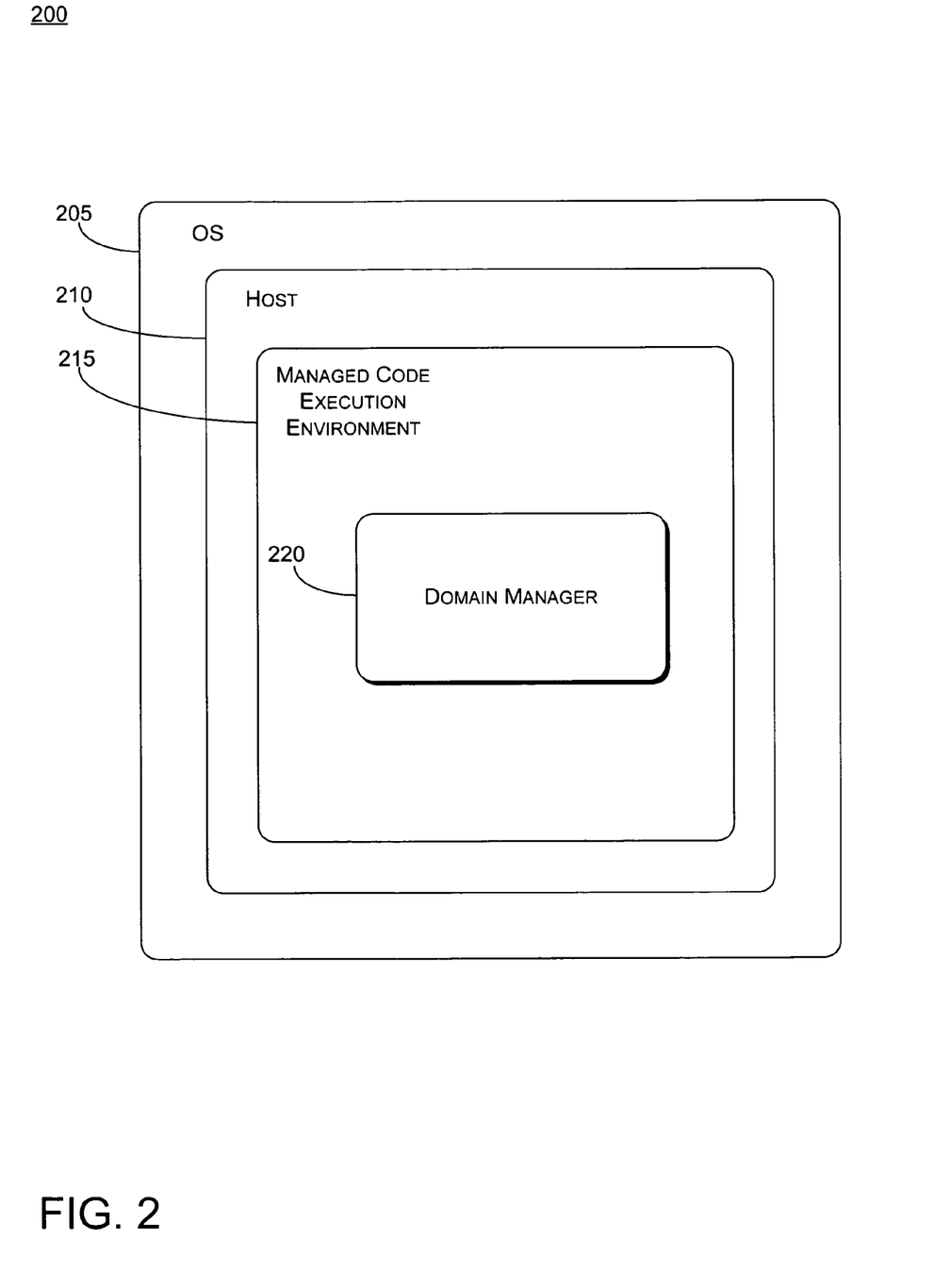
FIG. 2 shows an example hosting execution environment in which application domain managers may be implemented.

FIG. 2 shows an example hosting execution environment 200 for application domain manager implementation 120.

Operating system (OS) 205 may have host application 210 running thereon. In turn, managed code execution environment 215 (e.g., runtime execution environment) may provide one or more routines for host application 210 to perform properly on OS 205 because host application 210 may require another system in order to execute. Thus, host application 210 may call one or more routines from execution environment 215, and the routines called from execution environment 215 may call one or more appropriate routines from OS 205.

Managed code execution environments have been developed to enhance the reliability of software execution on a growing range of processing devices including servers, desktop computers, laptop computers, and a host of mobile processing devices. More particularly, runtime execution environments may provide a layer of abstraction and services to an application running on a processing device, and further provide such an application with capabilities including error handling and automatic memory management.

Domain manager 220, which may run on managed code execution environment 215, may be an extensible class (i.e., user-defined data type) that enables host application 210 (FIG. 2) to manage isolation constructs (i.e., application domains) therein. Thus, domain manager 220 may enable and manage transactions between, e.g., host application 210 and execution environment 215, whereby the transactions include processing within an application domain. More particularly, transactions group operations together into a single atomic operation, that is, an operation of which the results of the individual operations stand or fall together.

The transactions managed by domain manager 220 may be implemented by utilizing one or more application program interfaces (API) that are compatible with APIs of various system architectures. More particularly, the APIs implemented by domain manager 220 may be capable of creating new application domains within a process and customizing a newly created application domain, typically before managed code is executed in the new domain. That is, the APIs may be capable of managing (i.e., at least one of controlling and customizing) application domains further to the specifications provided by a manifest of a corresponding application or process. Further, one or more of the APIs implemented by domain manager 220 may provide additional interfaces and methods to enable other APIs to participate in the execution of managed code in managed code execution environment 215 (FIG. 2).

APIs implemented by domain manager 220 (FIG. 2) are listed and described below. The nomenclature for the APIs listed and described below is provided for descriptive purposes, and are intended as non-limiting examples.

AppDomainManager may refer to a class of which instantiations enable host application 210 (FIG. 2) to create, customize, and otherwise manage new application domains (i.e., isolation construct) within an application or process. Domain manager 220 may be a custom manager, which may be implemented by host application 210 or, alternatively, may be derived by an instantiation of the default AppDomainManager provided by the execution environment (e.g., CLR).

ApplicationActivator may refer to an API of the AppDomainManager class that enables host application 210 to initialize, customize, or otherwise manage activation of extensions and additions (i.e., "add-ins") in a newly created application domain. ApplicationActivator may permit one or more add-ins to be activated in a same application domain or, alternatively, may require an activation of an add-in to proceed to a different domain. Activation, security, and initialization parameters for an add-in may be specified in a manifest corresponding to the add-in. The manifest may specify a default entry point to initialize the add-in or to specify a default assembly or type name to be activated as part of the add-in activation. ApplicationActivator may consider host-specific requirements, as well as requirements of the add-in that may be specified in the manifest, when activating the add-in.

HostExecutionContextManager may refer to an API of the AppDomainManager class that enables host application 210 to direct, customize, or otherwise manage the flow of information relevant to a logical thread of execution across asynchronous calls. More particularly, the HostExecutionContextManager class may refer to an ExecutionContext subclass of which instantiations include, at least, a security context, a call context, a synchronization context, a localization context, and a transaction context.

HostRemotingManager may refer to an API of the AppDomainManager class that enables host application 210 to direct, customize, manage, or otherwise participate in cross-application domain calls. That is, an instantiation of the HostRemotingManager API may participate in calls that enter and leave one or more application domains.

HostSecurityManager may refer to an API of the AppDomainManager class that enables host application 210 to direct, customize, or otherwise manage security settings for a newly created application domain.

AppDomainManager.CreateDomain may refer to a customizable API of the AppDomainManager class that delegates a call to newly create an application domain. In particular, AppDomainManager.CreateDomain may delegate one or more calls to a AppDomainManager.CreateDomainHelper API that actually creates application domain.

AppDomainManager.CreateDomainHelper may refer to an API of the AppDomainManager class that handles the actual creation of an application domain. A description of an example procedure for creating such an application domain is as follows.

In particular, when CreateDomainHelper is called for activation of an add-in activation, the add-in may be verified by calling a further API of the AppDomainManager class e.g., HostSecurityManager.DetermineApplicationTrust, which may return a persisted verification result. If a decision has not been persisted, HostSecurityManager may call yet another API of the AppDomainManager class, e.g., TrustManager, to obtain a run/no-run decision for the application to be created. If a no-run decision is returned, activation of the add-in may fail. Otherwise, activation of the add-in may proceed.

A subsequent call, which may be the next call when CreateDomainHelper is called for activation of an add-in or a first call in the alternative, is to execution environment 215 (FIG. 2) with arguments (i.e., AppDomainSetup parameters) to newly create an application domain. Execution environment may set up data structures for the application domain to be created, and transition the data structures into the new application domain.

A type of AppDomainManager for a new application domain may then be determined. More particularly, according to one example, if a default domain manager is specified by host application 210, an instance of the default domain manager may be created. According to another example, an instance of AppDomainManager that is bootstrapped to the startup of host application 210 may be created. Alternatively, if CreateDomain is called for activating an add-in, as described above, then an appropriate domain manager for the add-in may be called. According to yet another alternative example, a default AppDomainManager may be implemented if no other implementation is specified or otherwise provided.

Execution environment 215 may then proceed to verify that the selected AppDomainManager is able to support the type/API that is expected therefrom. Execution environment 215 may further verify that AppDomainManager is able to satisfy security requirements expected therefrom, as well as verify that AppDomainManger satisfies various requirements (e.g., security) of host application 210.

AppDomainManager may then be instantiated to thus enable domain manager 220 (FIG. 2) to configure and manager the newly created application domain.

The newly created application domain may then be initialized. Execution environment 215 may call into AppDomainManager.InitializeNewDomain to allow the AppDomainManager to configure the newly created application domain. To this end, execution environment 215 may also pass in set up parameters that are passed in to the CreateDomain helper API by an original caller. An implementation of InitializeNewDomain for a default AppDomainManager may not be required to make any call.

Alternatively, a custom AppDomainManager.InitializeNewDomain may be called to set up a new application domain in a customized manner. In that event, custom AppDomainManager may also call a further AppDomainManager API (i.e., InitializationFlags) to indicate to execution environment 215 a request to register a current AppDomainManager with host application 210 because a custom AppDomainManager may typically implement corresponding interfaces to be accessible from host application 210.

In the event that AppDomainManager is an add-in activation, then a further API of the AppDomainManager may initialize an ActivationContext property for the current domain of the add-in. ActivationContext may serve to uniquely identify the add-in and, further, to provide access to details and descriptions pertaining to the add-in, including the corresponding manifest. ActivationContext may also be passed through as a parameter for AppDomainSetup to CreateDomainHelper.

A subsequent call may be made to a further API of the AppDomainManager, i.e., AppDomainManager.ApplicationActivor, to thereby enable host application 210 to supply a custom activator for the newly created application domain. This activator may be used to manage further activations initiated from the newly created application domain.

A subsequent call may be made to a further API of the AppDomainManager, i.e., AppDomainManager.HostExecutionContextManager, to thereby enable host application 210 to participate in the flow of ExecutionContexts, that is, to direct, customize, or otherwise manage the flow of information relevant to a logical thread of execution across asynchronous calls in the newly created application domain.

According to at least one example, a subsequent call may be made to a further API of the AppDomainManager, i.e., AppDomainManager.RemotingManager, to thereby enable host application 210 to participate in cross-application domain calls, that is, to direct, customize, manage, or otherwise participate in cross-application domain calls corresponding to the newly created application domain.

A further call may be made to a further API of the AppDomainManager, i.e., AppDomainManager.SecurityManager, to thereby enable host application 210 to participate in setting the security parameters for the newly created application domain to be created, that is, to direct, customize, or otherwise manage security settings for a newly created application domain.

Calls to further APIs of the AppDomainManager may include: a call to HostSecurityManager.GetDomainPolicy to obtain a security policy for an existing application domain; a call to HostSecurityManager.ProvideEvidence to thereby enable host application 210 to supply evidence for a current application domain.

In the event of an add-in activation, a further call may be to repeat the verification process for the add-in, i.e., a repeat call to HostSecurityManager.DeterminApplicationTrust to determine whether a current instance of AppDomainManager allows the add-in to be activated. If the result is a no-run decision, the add-in activation may not proceed.

Accordingly, by the calls described above, in various orders and combinations that may include or exclude one or more thereof, AppDomainManager has newly created an application domain and configured the application domain appropriately. If the application domain is for an add-in, a call may be made to a still further API of the AppDomainManager, i.e., ApplicationActivator.CreateInstance, to complete the activation.

The newly created application domain may then be initialized. An implementation of InitializeNewDomain for a default AppDomainManager may not be required to make any call.

Alternatively, a custom AppDomainManger.InitializeNewDomain may be called to set up the new application domain in a customized manner. That is, the new application domain may be configured according to specific needs or requests corresponding to host application 210. In that event, custom AppDomainManager may also call a further AppDomainManager API, i.e., InitializationFlags, to thereby enable execution environment 215 to register the Com Collable Wrapper (CCW) of the current AppDomainManager with host application 210 because a custom AppDomainManager may typically implement its own interfaces to be accessible from host application 210. More particularly, CCW may be registered so that a managed AppDomainManager may be called from host application 210.

HostRemotingManager may refer to a class of which instantiations in execution environment 215 enable host application 210 (FIG. 2) to create, customize, manage, and otherwise participate in remoting calls across one or more application domains that are newly created as described above in correspondence with the AppDomainManager class.

EnterAppDomain may refer to an API of the HostRemotingManager class that enables a call in host application 210 to enter an intended, i.e., target, application domain from a source application domain.

LeaveAppDomain may refer to an API of the HostRemotingManager class that enables a call in host application 210 to unwind out of the aforementioned target application domain upon completion of the cross-application domain call.

ReverseEnter may refer to an API of the HostRemotingManager class that enables a call in host application 210 to enter the source application domain while returning from a cross-application domain call.

ReverseLeave may refer to an API of the HostRemotingManager class that enables a call in host application 210 to enter the target application domain when a cross-application domain call leaves the source domain.

HostSecurityManager may refer to a class of which instantiations enable host application 210 (FIG. 2) to create, customize, manage, and otherwise participate in setting security policy in an application domain.

DomainPolicy may refer to an API of the HostSecurityManager class that enables host application 210 to supply a security policy for a newly created application domain.

ProvideAppDomainEvidence may refer to an API of the HostSecurityManager class that enables host application 210 to provide evidence, i.e., input arguments corresponding to security policy, to a newly created application domain.

ProvideAssemblyEvidence may refer to an API of the HostSecurityManager class that enables host application 210 to choose to extend or reduce evidence, i.e., input arguments, that may be utilized by execution environment 215 for loading an assembly to host application 210.

DetermineApplicationTrust may refer to an API of the HostSecurityManager class that enables host application 210 to determine a level of trust accorded to a calling application domain and, either singularly or in combination therewith, determine whether an add-in activation may proceed from or into the current application domain.

The classes and corresponding APIs described above are non-limiting examples that may implemented by domain manager 220 (FIG. 2). As stated previously, the nomenclature for the aforementioned classes and APIs is provided for descriptive purposes, and should not be considered to be restrictive in any way.

Figure 3:
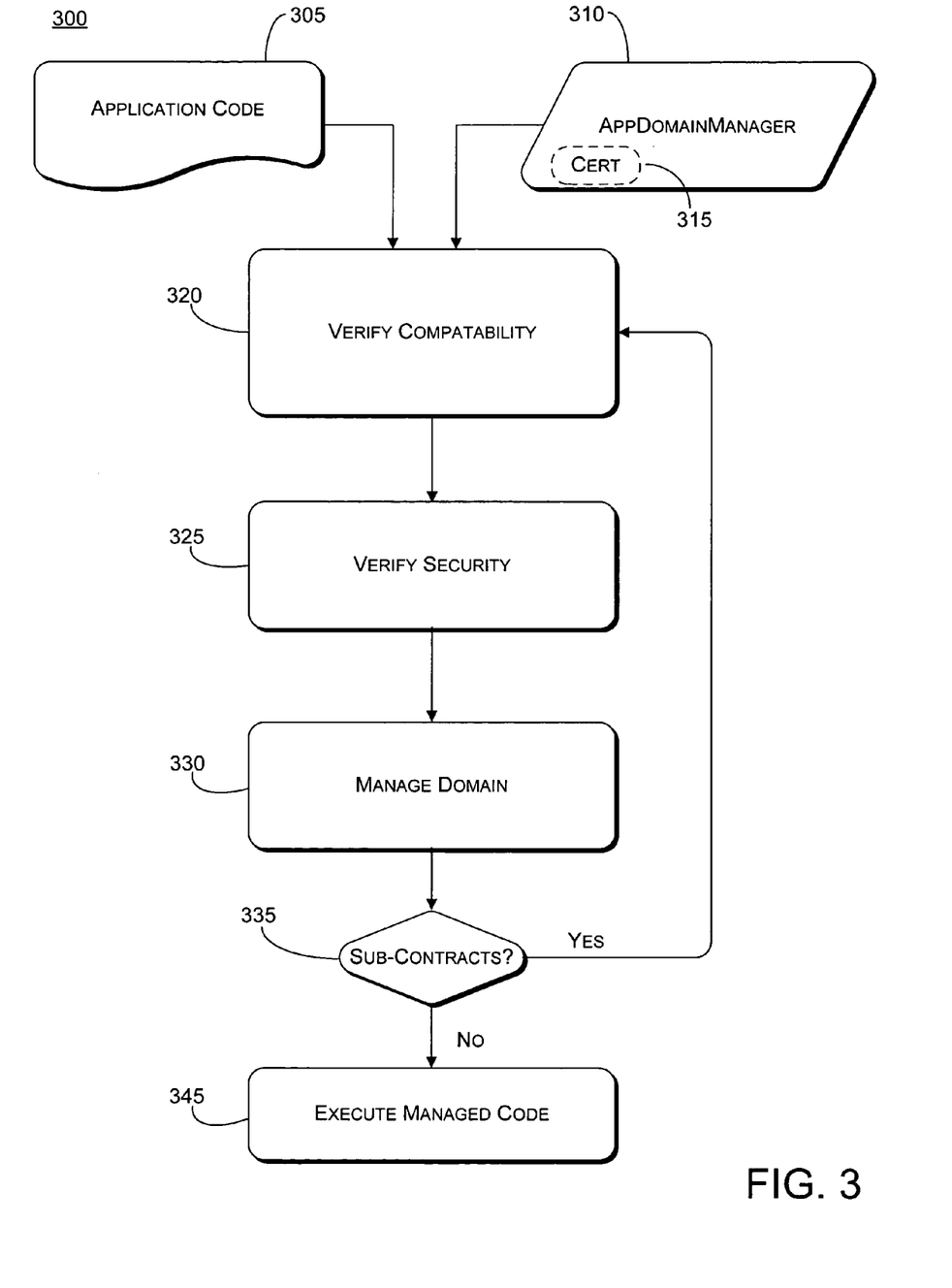
FIG. 3 shows an example processing flow associated with implementing an application domain manager.

FIG. 3 shows example processing flow 300 associated with implementing an application domain manager. Processing flow 300 may be executed utilizing the classes and corresponding APIs described above in connection with FIG. 2. However, such classes and APIs are provided as examples only, and are in no way limiting of the implementations described herein.

Application code 305 may incorporate at least portions of host application 210 (FIG. 2) including, but not limited to, a manifest that includes, e.g., activation, security, and initialization parameters for an application domain.

Application domain manager 310 may be a data structure that is provided as part of application code 305 or as a separate code entity. Further, application domain manager 310 may further incorporate certificate 315 that includes permissions desired, or even required, for application domain manager 310 to manage an application domain in correspondence with application code 305.

Block 320 may represent a verification, performed in execution environment 315 (FIG. 2) of the, e.g., activation and initialization functionalities supported by application domain manager 310. The verification may be performed by measuring the parameters provided in a manifest included in application code 305 against those provided by application domain manager 310. According to at least one alternative example, the manifest of host application 210 may be provided by a separate medium or even by an off-line transmission.

Block 325 may represent a further verification of a security policy supported by application domain manager 310. The verification may be performed by measuring the security policy set forth in the manifest of application code 305 against the security policy provided by application domain manager 310. According to at least one alternative example, the manifest of host application 210 may be provided by a separate medium or even by an off-line transmission. According to even further examples, the verifications occurring at blocks 320 and 325 may be performed in an inverse order or even in combination with each other.

Block 330 may represent the management of an application domain, subsequent to positive verifications at blocks 320 and 325. That is, at block 325, in accordance with a data structure (i.e., contract) provided by application domain manager 310 to specify at least, e.g., activation, security, and initialization functionalities of application domain manager 310, a newly created application domain may be initialized. Further, the functionalities to be implemented by application domain manager 310 may be customized herein.

Decision 335 may represent a determination made by host application 210 of the existence of sub-contracts within application domain manager 310. That is, within a newly created and initialized application domain, one or more application domains may be created and initialized, as specified.

Positive decision 335 may return processing 300 back to blocks 320 and 325 for verification of the compatibility and security of the sub-contracted application domain.

Negative decision 335 may advance processing 300 to the execution of managed code within the one or more newly created and initialized application domains in host application 210.

Figure 4:
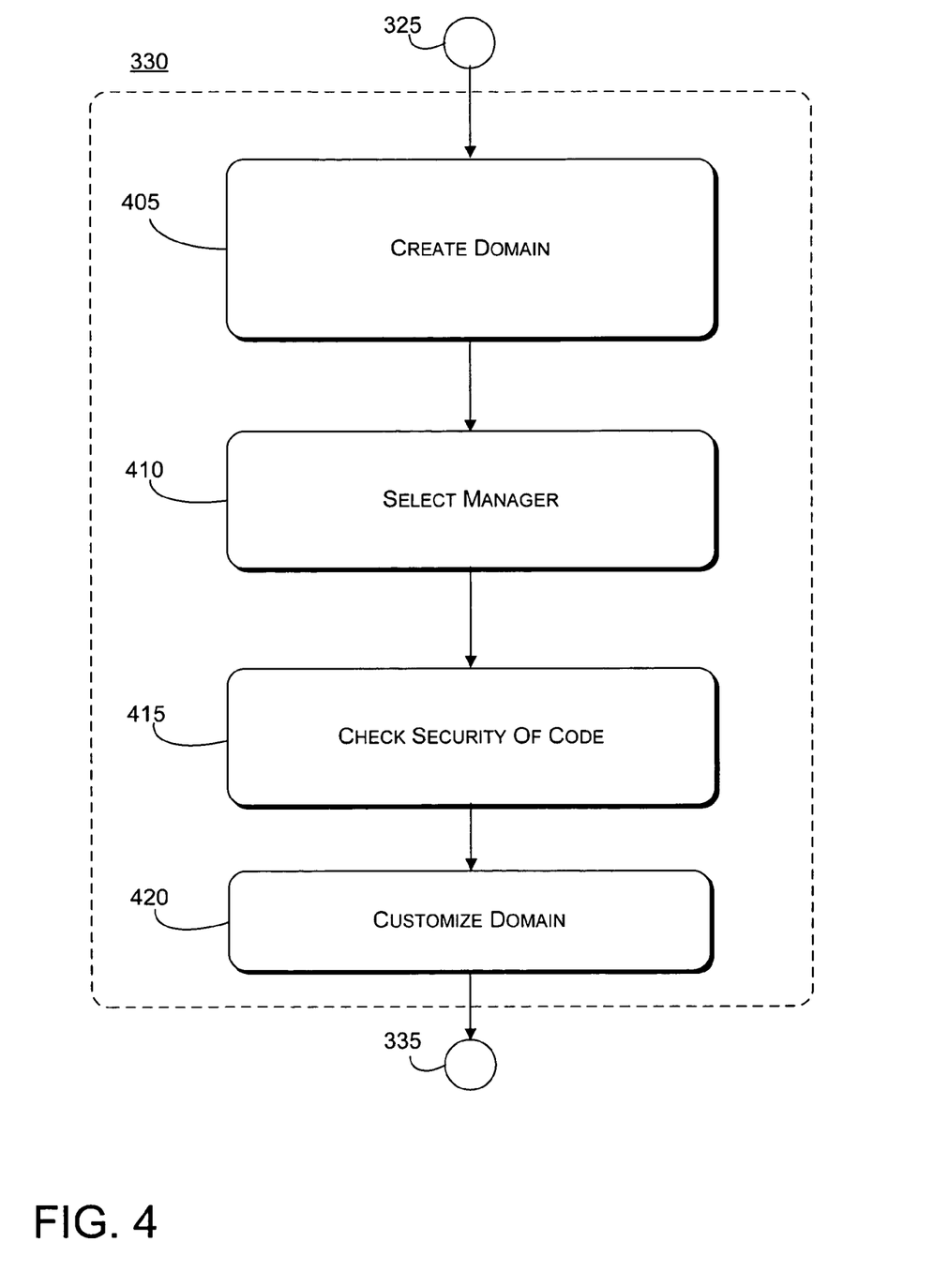
FIG. 4 shows an example processing flow further to the example processing flow of FIG. 3.

FIG. 4 shows example processing flow to further describe block 330 of FIG. 3.

Block 405 may represent the creation of an application domain specified or requested by, e.g., application domain manager 310, by an instantiation of AppDomainManager. The creation of an application domain may further be specified or requested by execution environment 215.

Block 410 may represent a selection of the manager of the newly created application domain as specified or requested by application domain manager 310, i.e., by an instantiation of AppDomainManager.

Block 415 may represent a verification of the security of the managed code of host application 210 to be executed in the newly created application domain. The verification may be made against the security parameters of the AppDomainManager class.

Block 420 may represent a configuration or management (i.e., customization) of the newly application domain. That is, upon a positive verification of the security of the managed code of host application 210, the application may be customized to implement only desired functionalities, in anticipation of the execution of managed code at node 235.

Accordingly, an application domain may be managed by customized parameters.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
    creating an isolation construct of an application, the isolation construct implemented within a process on a computer running the application such that effects of processing code that is loaded and executed within the isolation construct are isolated from other constructs within the process;
    designating a manager for the isolation construct of the application, the manager implemented by a managed code runtime execution environment on the computer that is configured to compile and execute managed code for the application, the manager designated for managing transactions between the application and the managed code runtime execution environment, the transactions including processing the managed code for the application within the isolation construct of the application;
    verifying that the manager satisfies at least portions of a manifest for the application that provides specifications of the isolation construct;
    managing the isolation construct of the application in accordance with the specifications of the manifest utilizing one or more application programming interfaces implemented by the manager; and
    executing the managed code for the application within the isolation construct of the application.

2. A method according to claim 1, wherein the designating includes a hosting execution environment designating a default manager for the isolation construct of the application.

3. A method according to claim 1, wherein the designating includes a previously designated manager designating a manager for the isolation construct of the application, wherein the isolation construct is a sub-construct of an isolation construct managed by the previously designated manager.

4. A method according to claim 1, wherein the verifying includes verifying that the manager satisfies capability requirements included in the manifest for the application.

5. A method according to claim 1, wherein the verifying includes verifying that the manager satisfies security requirements included in the manifest for the application.

6. A method according to claim 1, wherein the managing includes:
    initializing an isolation sub-construct for the application;
    designating a manager for the isolation sub-construct for the application; and
    verifying that the designated manager for the isolation sub-construct satisfies portions of the manifest for the application.

7. A method according to claim 1, wherein the managing includes a hosting execution environment implementing a managing class within the isolation construct of the application.

8. A method according to claim 1, wherein the managing includes a hosting execution environment implementing a security class within the isolation construct of the application.

9. A computer-readable storage medium having one or more executable instructions that, when read, cause one or more processors to:
    create an application domain within a process on a computer such that effects of processing code that is loaded and executed within the application domain are isolated from other application domains within the process;
    specify a manager of the application domain within the process, the manager implemented by a managed code runtime execution environment on the computer that is configured to compile and execute managed code for the process, the manager configured to manage transactions of the process with the managed code runtime execution environment, the transactions including processing the managed code for the process within the application domain;
    manage the application domain utilizing one or more application programming interfaces implemented by the manager capable of creating the application domain within the process; and
    execute the managed code for the process within the application domain.

10. A computer-readable storage medium according to claim 9, wherein the one or more instructions to specify the manager of the application domain within the process cause the one or more processors to implement a default management function for the application domain.

11. A computer-readable storage medium according to claim 9, wherein the application domain is created by one of the manager and the managed code runtime execution environment.

12. A computer-readable storage medium according to claim 9, wherein the one or more instructions to manage the application domain cause the one or more processors to create the application domain, select the manager for the application domain, and customize the application domain.

13. A computer-readable storage medium according to claim 9, wherein the one or more instructions to manage the application domain cause the one or more processors to customize the application domain by choosing to selectively manage at least one of add-in activation, security functionality, and host execution within the application domain.

14. A computer-readable storage medium having a data structure stored thereon for managing an application domain, the data structure comprising:
    a first data field representing a designation of a manager for an application domain created for an application, the application domain implemented within a process on a computer such that effects of processing code that is loaded and executed within the application domain are isolated from other application domains within the process, the manager implemented by a managed code runtime execution environment on the computer that is configured to compile and execute managed code for the process, the manager configured to manage transactions between the application and the managed code runtime execution environment, the transactions including processing the managed code for the application within the application domain;

a second data field representing functionalities controllable by the manager of the application domain via application programming interfaces implemented by the manager; and a third data field representing the controllable functionalities selected to be controlled by the manager of the application domain for processing managed code for the application within the application domain.

15. A computer-readable storage medium according to claim 14, wherein the first data field includes a designation by a hosting execution environment of a default manager for the application domain.

16. A computer-readable storage medium according to claim 14, wherein the first data field includes a designation by a previously designated manager for the manager of the application domain, wherein the application domain is created within another application domain.

17. A computer-readable storage medium according to claim 14, wherein the functionalities controllable by the manager for the application domain include the creation of further application domains, designation of a respective manager for the further created application domains, and security requirements for the application domain.

18. A computer-readable storage medium according to claim 14, wherein the functionalities represented in the second data field are extensible.

19. A method according to claim 1, further comprising managing activation of extensions and additions to the isolation construct of the application.

20. A method according to claim 1, further comprising customizing the isolation construct of the application.

* * * * *